United States Patent
Hillier, III et al.

(10) Patent No.: US 7,257,686 B2
(45) Date of Patent: Aug. 14, 2007

(54) MEMORY CONTROLLER AND METHOD FOR SCRUBBING MEMORY WITHOUT USING EXPLICIT ATOMIC OPERATIONS

(75) Inventors: Philip Rogers Hillier, III, Rochester, MN (US); Joseph Allen Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 10/860,404

(22) Filed: Jun. 3, 2004

(65) Prior Publication Data

US 2005/0273646 A1 Dec. 8, 2005

(51) Int. Cl.
*G06F 12/06* (2006.01)
(52) U.S. Cl. ...................... 711/155; 711/141
(58) Field of Classification Search ............. 711/133, 711/167, 153, 137, 155, 141; 714/5
See application file for complete search history.

(56) References Cited

U.S. PATENT DOCUMENTS

| | | | | |
|---|---|---|---|---|
| 5,495,491 A * | 2/1996 | Snowden et al. | ........... | 714/764 |
| 6,560,725 B1 * | 5/2003 | Longwell et al. | ............. | 714/54 |
| 6,832,340 B2 * | 12/2004 | Larson et al. | ............... | 714/718 |
| 6,901,485 B2 * | 5/2005 | Arimilli et al. | ............. | 711/135 |
| 2005/0028048 A1 * | 2/2005 | New et al. | .................... | 714/54 |

OTHER PUBLICATIONS

Hillier III et al., IBM U.S. Appl. No. 10/865,250, filed Jun. 10, 2004, "Memory Controller and Method for Copying Mirrored Memory".
"IBM Enterprise X-Architecture Technology", First Edition 2002, "Reaching the summit".

* cited by examiner

*Primary Examiner*—Pierre-Michel Bataille
(74) *Attorney, Agent, or Firm*—Martin & Associates; Derek P. Martin

(57) ABSTRACT

A memory controller includes scrub circuitry that performs scrub cycles in a way that does not delay processor reads to memory during the scrub cycle. Atomicity of the scrub operation is assured by protocols set up in the memory controller, not by using an explicit atomic read-correct-write operation. The result is a memory controller that efficiently scrubs memory while minimizing the impact of scrub cycles on system performance.

8 Claims, 6 Drawing Sheets

MEMORY CONTROLLER AND METHOD FOR SCRUBBING MEMORY WITHOUT USING EXPLICIT ATOMIC OPERATIONS

BACKGROUND OF THE INVENTION

1. Technical Field

This invention generally relates to computer system memory, and more specifically relates to ways of scrubbing computer system memory to correct errors.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). One key component in any computer system is memory.

Modern computer systems typically include dynamic random-access memory (DRAM). DRAM is different than static RAM in that its contents must be continually refreshed to avoid losing data. A static RAM, in contrast, maintains its contents as long as power is present without the need to refresh the memory. This maintenance of memory in a static RAM comes at the expense of additional transistors for each memory cell that are not required in a DRAM cell. For this reason, DRAMs typically have densities significantly greater than static RAMs, thereby providing a much greater amount of memory at a lower cost than is possible using static RAM.

Modern DRAM memory controllers use a technique known as "scrubbing" to automatically detect and correct soft errors that may arise in memory that are typically caused by alpha particles. Sophisticated error correction circuitry has been developed that allow detecting any single-bit error, or any single-symbol error in a DRAM. A single-bit error occurs when one bit at a specified address changes state unexpectedly. A single-symbol error occurs when multiple bits within a packet (or symbol) at a specified address in a single DRAM chip change state unexpectedly. During a typical scrub cycle, a cache line is read, causing a corresponding read of the data from memory. The error correction circuitry detects if there are any single-bit or single-symbol errors, and if so, generates the correct data, which is then written to the cacheline, and in turn, back to the memory. In this manner, the scrub circuitry may successfully recover from any single-bit or single-symbol errors in memory. In many computer systems, the scrub circuitry tries to scrub all of system memory at least one each day. A brief description of memory scrubbing is found in IBM Enterprise X-Architecture Technology, First Edition 2002, pp. 19-21, which is incorporated herein by reference.

A scrub cycle typically occurs when there are no pending processor reads or writes to memory. Once the scrub cycle starts, the entire read-correct-write sequence is performed as an atomic operation to assure data integrity. If processor reads occur just after the read operation in the scrub cycle, the processor reads have to wait until the atomic read-correct-write scrub operation is performed. As a result, prior art memory controllers negatively affect system performance when performing scrub cycles. Without a way for performing scrub cycles in a way that does not make processor read cycles wait, the computer industry will continue to be plagued with decreased performance during scrub cycles.

DISCLOSURE OF INVENTION

A memory controller includes scrub circuitry that performs scrub cycles in a way that does not delay processor reads to memory during the scrub cycle. Atomicity of the scrub operation is assured by protocols set up in the memory controller, not by using an explicit atomic read-correct-write operation. The result is a memory controller that efficiently scrubs memory while minimizing the impact of scrub cycles on system performance.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 4:
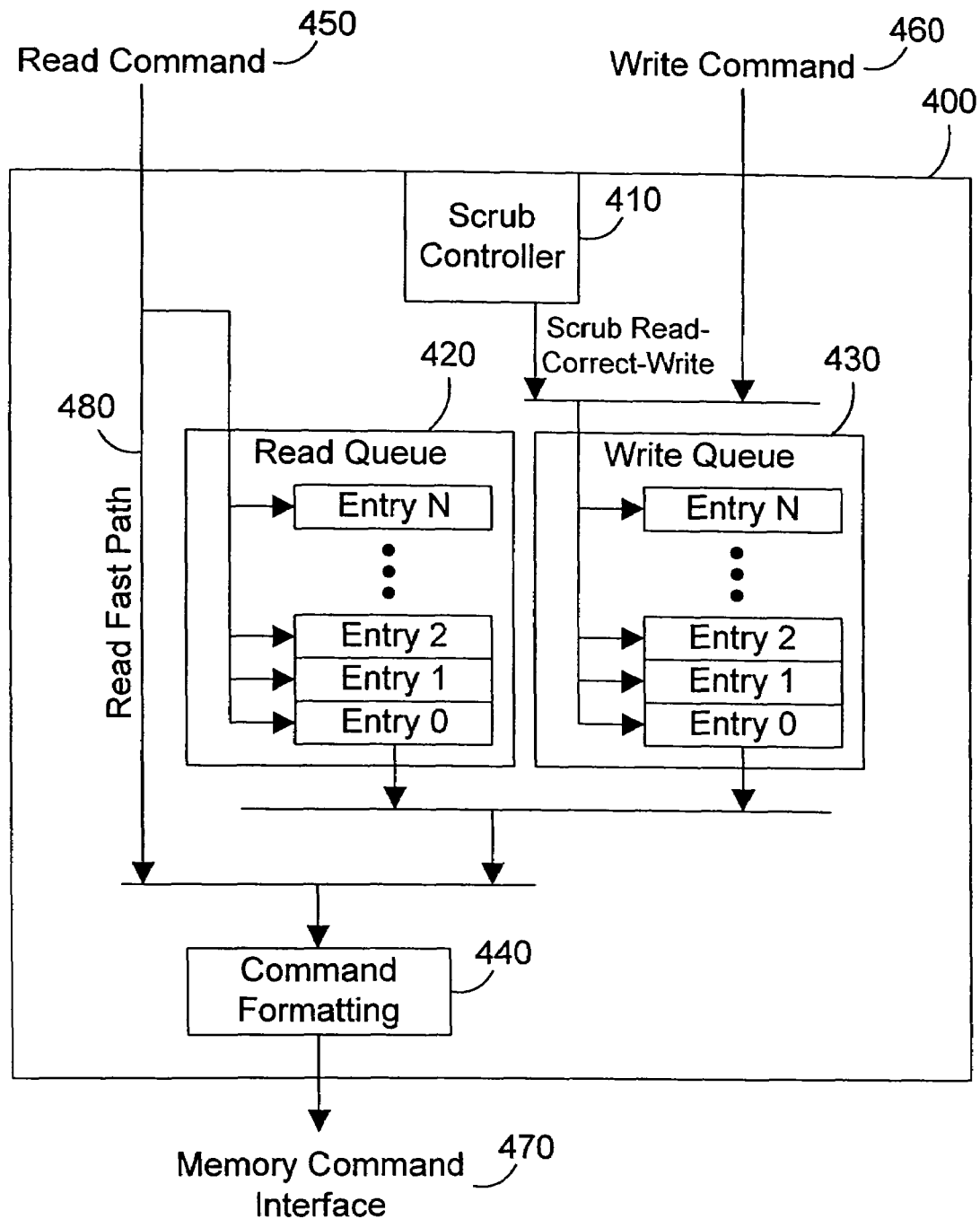
FIG. 4 is a block diagram of a prior art memory controller.

A prior art memory controller and method are first presented herein to provide a context for the discussion of the preferred embodiments. Referring to FIG. 4, a prior art memory controller 400 includes a scrub controller 410, a read queue 420, a write queue 430, and command formatting logic 440. A read command 450 from a processor may be written to the read queue 420, or may alternatively be passed via the fast read path 480 to the command formatting logic 440. The read queue 420 includes a plurality of entries that are processed by the memory controller 400. A write command 460 from the processor may be written to the write queue 430. The write queue 430 includes a plurality of entries that are processed by the memory controller 400. In this prior art memory controller 400, read operations have priority over write operations, so the read queue 420 is serviced until all its entries have been processed, at which time one or more entries in the write queue 430 may be processed. The command formatting logic 440 presents appropriate commands to the memory via the memory command interface 470, such as read and write commands to memory.

The scrub controller 410 includes the logic to perform scrub cycles at periodic intervals, typically during times when other memory accesses are not pending. The scrub controller 410 issues a special command to the write queue 430. This command is referred to herein as a "read-correct-write" operation. This operation is so designated due to its atomic operation. Atomic operation means that once the read-correct-write operation is commenced, all other accesses to the memory are delayed until the read-correct-write operation is complete. During the read-correct-write cycle, the scrub controller reads a cache line from memory, uses internal error correction circuitry (not shown) to determine whether there is a single-bit or single-symbol error in the read data, corrects the data, and writes the corrected data back to the cacheline. The result is that single-bit and single-symbol errors in memory are dynamically corrected by the scrub controller.

Figure 5:
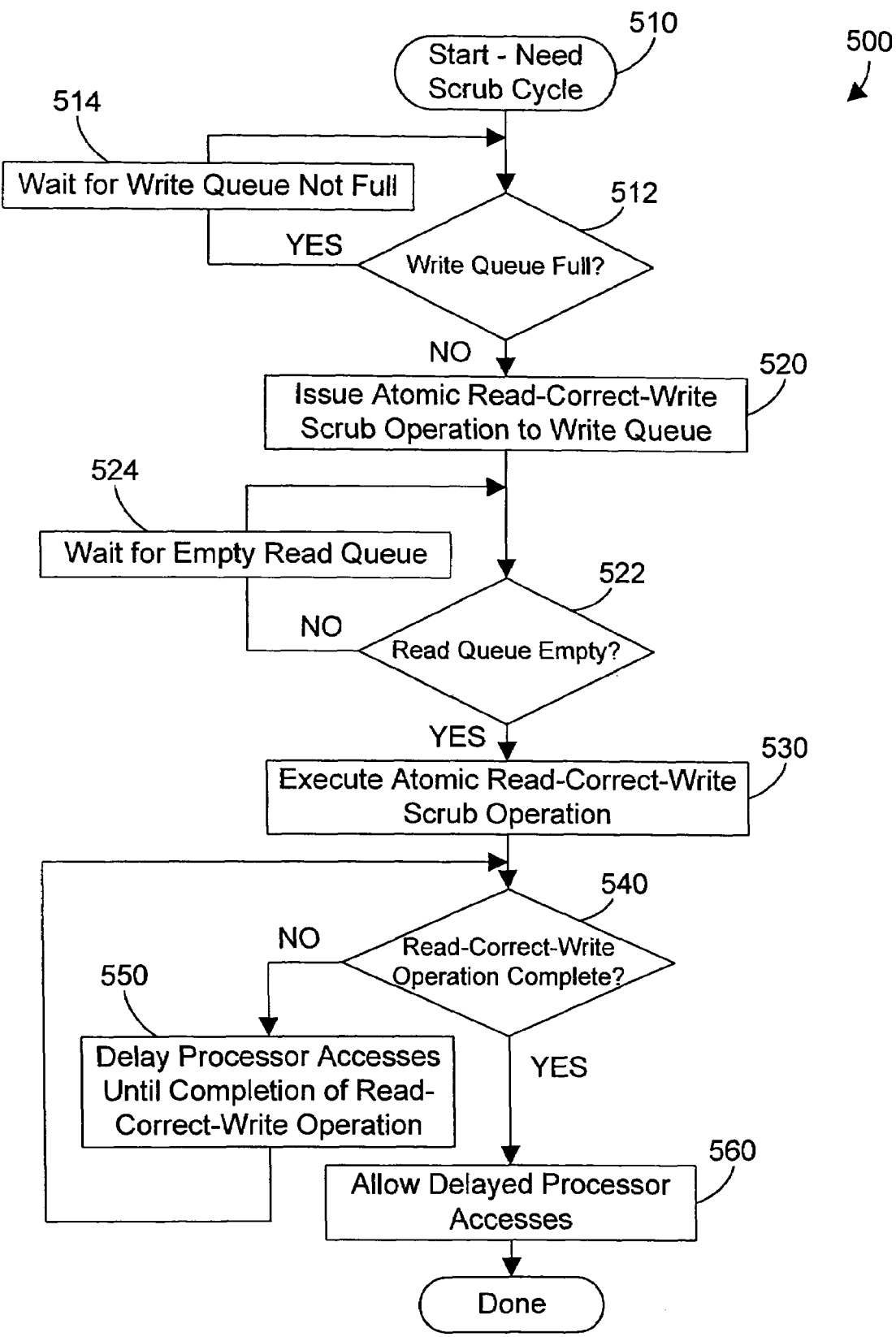
FIG. 5 is a flow diagram of a prior art method for scrubbing memory.

A prior art method 500 for the scrub controller 410 in FIG. 4 is shown in FIG. 5. Method 500 begins when a scrub cycle needs to be performed (step 510). Scrub operations are written to the write queue, so if the write queue is full (step 512=YES), method 500 must wait until the write queue is not full (step 514). Once there is room in the write queue to write the scrub operation (step 512=NO), the atomic read-correct-write scrub operation is written to the write queue (step 520). Because the operations in the read queue have priority over operations in the write queue, if the read queue is not empty (step 522=NO), method 500 waits until the read queue is empty (step 524). Once the read queue is empty (step 522=YES), the atomic read-correct-write scrub operation is executed by the memory controller (step 530). As long as the read-correct-write scrub operation is not complete (step 540=NO), any processor accesses are delayed until completion of the read-correct-write operation (step 550). Once the read-correct-write cycle completes (step 540=YES), the delayed processor accesses are then allowed to occur (step 560).

Figure 6:
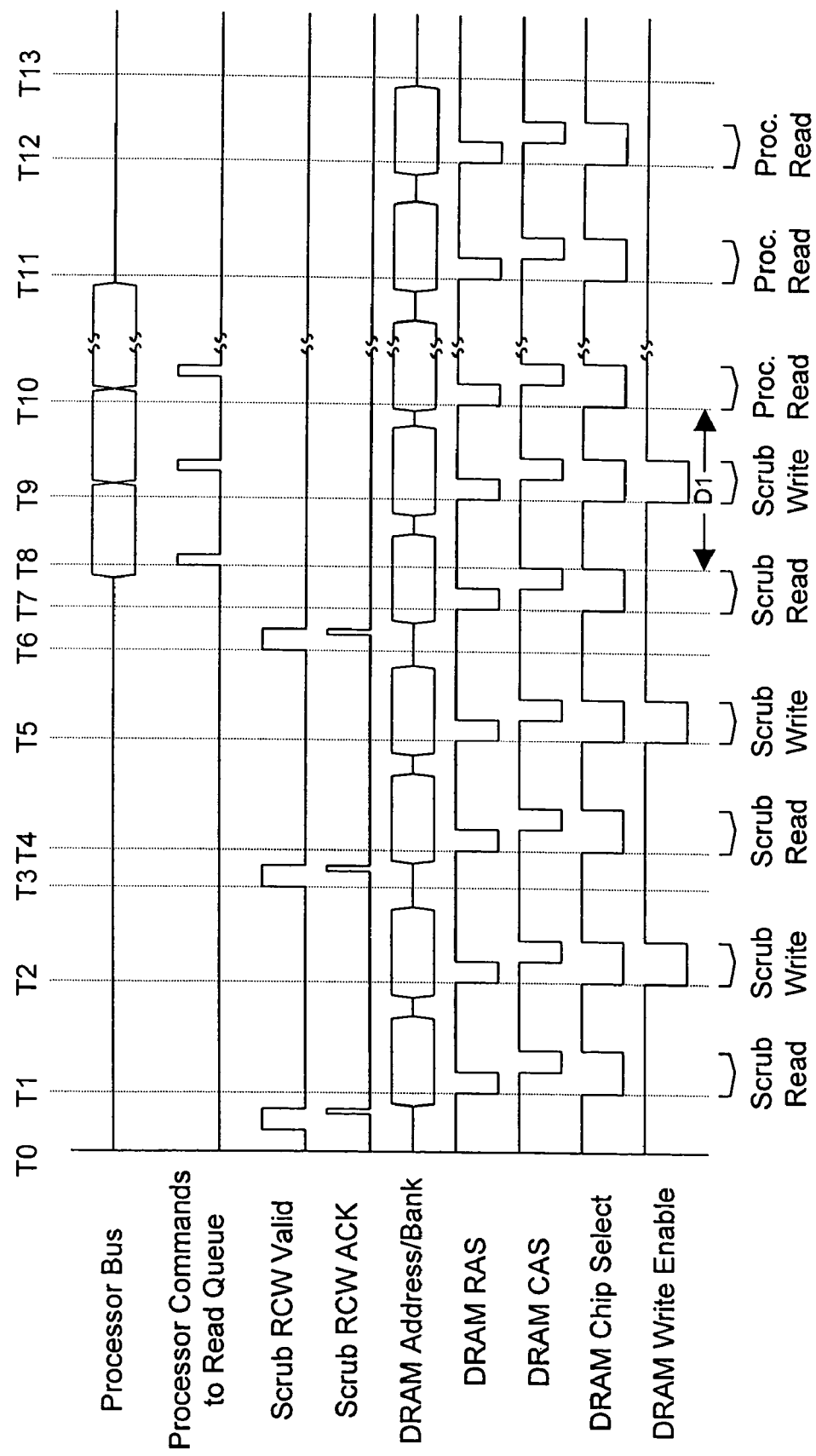
FIG. 6 is a sample timing diagram showing the function of the prior art memory controller of FIG. 4.

By delaying processor accesses that occur during the atomic read-correct-write cycle, each subsequent processor access suffers the delay time that resulted from waiting for the read-correct-write cycle to complete. The result is a decrease in system performance caused by this delay. The delay can be seen graphically in the timing diagram of FIG. 6. The timing diagram includes the signals for the processor bus, the processor commands to the read queue, scrub write and read signals, and DRAM signals that include Address/Bank, Row Address Select (RAS), Column Address Select (CAS), Chip Select, and Write Enable. The specific example shown in FIG. 6 shows three scrub cycles before a burst of processor reads. Between time T0 and T1, the Scrub Read-Correct-Write (RCW) is valid, and the Scrub RCW ACK acknowledges the occurrence of the Scrub RCW Valid signal. At time T1, data for the first scrub cycle is read. At time T2, data for the first scrub cycle is written back to memory. At time T3, the Scrub RCW Valid signal is asserted, followed by the Scrub RCW ACK. The read for the second scrub cycle occurs at T4, while the write occurs at T5. At time T6, the Scrub RCW Valid signal is asserted, followed by the Scrub RCW ACK. The read for the third scrub cycle occurs at T7. Note, however, that there is a burst of activity on the processor bus just after time T7. We assume for this example that this is a burst of memory reads by the processor. The processor read commands are written to the read queue as shown at T8 and just after T9 and just after T10. Note, however, that the reads are not yet allowed to happen. Because the scrub read started at time T7, the processor cycles must be delayed until the completion of the atomic read-correct-write operation. For this reason, the processor commands to the read queue do not show up on the DRAM bus signals during time period T8-T9, because the atomic read-correct-write scrub cycle is still pending. Once the scrub write occurs at time T9, the delayed processor reads are allowed to occur. Note that each read operation in the burst of reads shown from T8-T11 on the processor bus is delayed by the amount of time D1 it takes the atomic read-correct-write signal to complete. We assume the processor bus read burst stops by T11, as shown in FIG. 6, but the read operations to the DRAM continue into periods T11-T12 and T12-T13 because of the delay D1 from T8 to T10 that is caused by waiting for the explicit atomic read-correct-write operation to complete. The timing diagram of FIG. 6 clearly shows performance degradation caused by the prior art atomic read-correct-write cycles used to scrub memory.

Figure 1:
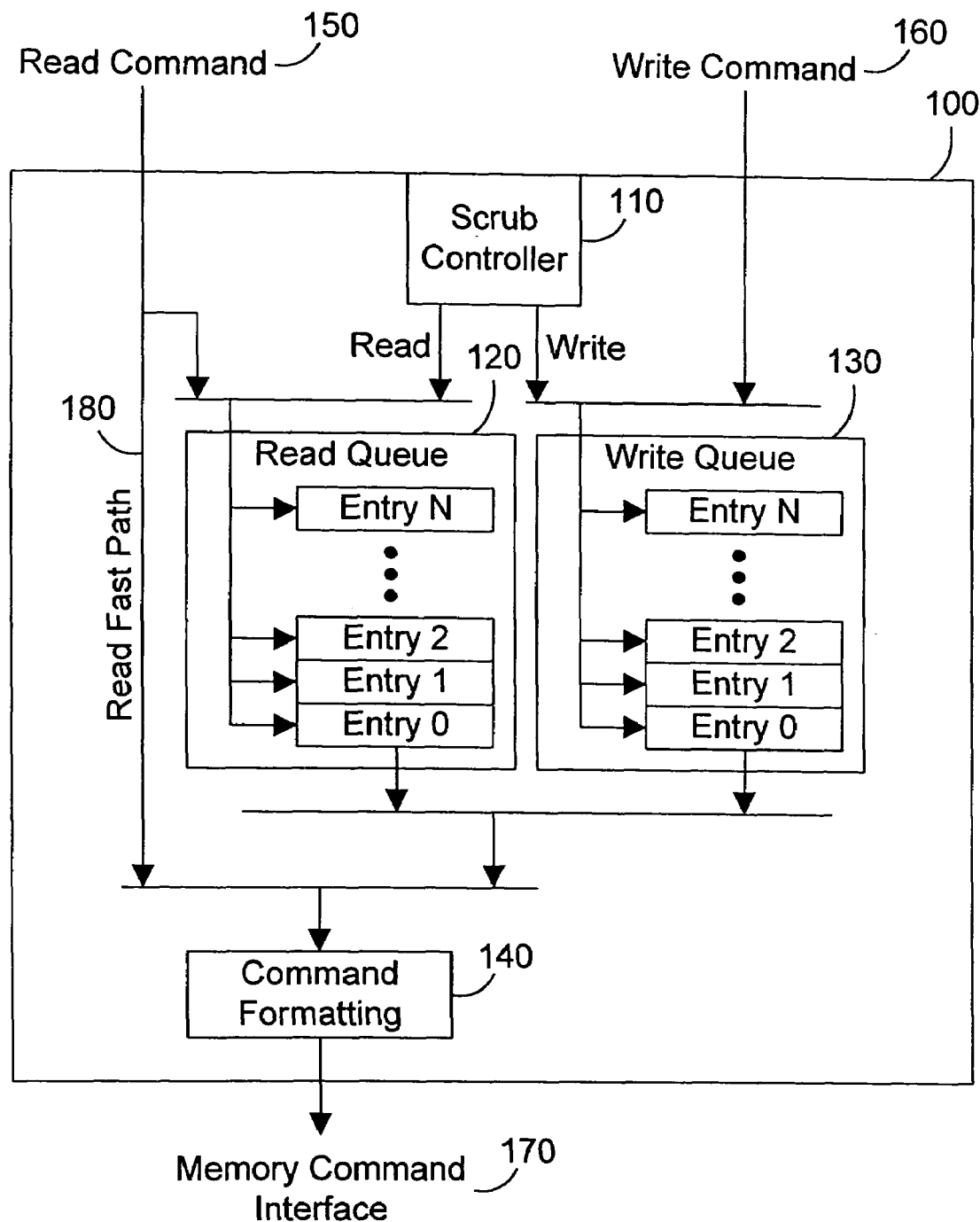
FIG. 1 is a block diagram of a memory controller in accordance with the preferred embodiments.

The preferred embodiments eliminate the use of the explicit read-correct-write operation, and replace it with a protocol that assures that processor read cycles are not delayed due to scrub cycles that are in progress. Referring to FIG. 1, a memory controller 100 in accordance with the preferred embodiments includes a scrub controller 110, a read queue 120, a write queue 130, and command formatting logic 140. A read command 150 from a processor may be written to the read queue 120, or may alternatively be passed via the fast read path 180 to the command formatting logic 140. The read queue 120 includes a plurality of entries that are processed by the memory controller 100. A write command 160 from the processor may be written to the write queue 130. The write queue 130 includes a plurality of entries that are processed by the memory controller 100. In the memory controller 100 of the preferred embodiments, read operations have priority over write operations (similar to the prior art), so the read queue 120 is serviced until all its entries have been processed, at which time one or more entries in the write queue 130 may be processed. The command formatting logic 140 presents appropriate commands to the memory via the memory command interface 170.

Note that many of the features in FIG. 1 correspond to similar features in prior art memory controller 400 in FIG. 4. For example, the read queue 120, write queue 130, command formatting logic 140, read command 150, write command 160, memory command interface 170, and read fast path 180 could be the same as the corresponding features 420, 430, 440, 450, 460, 470 and 480, respectively, shown in FIG. 4. Note, however, that is equally within the scope of the preferred embodiments for each of the items 120-180 to have different or additional functions when compared with the prior art items 420-480.

Figure 2:
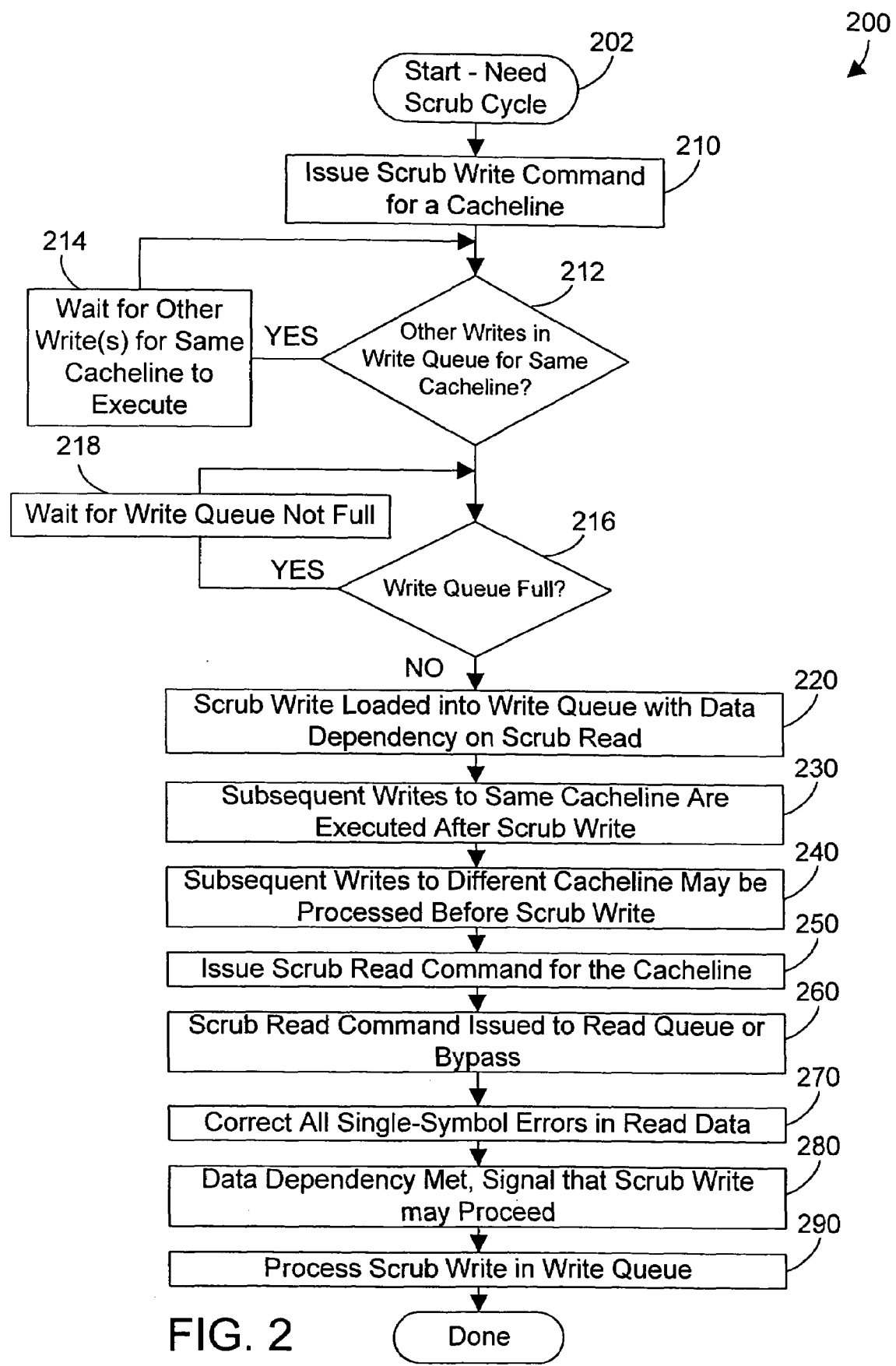
FIG. 2 is a flow diagram of a method for scrubbing memory in accordance with the preferred embodiments.

The scrub controller 110 includes the logic to perform scrub cycles when needed (e.g., at periodic intervals), typically during times when other memory accesses are not pending. Instead of having a single interface to the write queue as in the prior art (shown in FIG. 4), the scrub controller 110 of the preferred embodiments has a read interface for writing to the read queue 120 and a write interface for writing to the write queue 130. The memory controller 100 then implements a protocol in internal logic that assures that processor read cycles are not delayed during a scrub cycle. The internal logic is represented by method 200 in FIG. 2, which represents a method in accordance with the preferred embodiments for the memory controller 100 to perform a scrub cycle. Method 200 begins when a scrub cycle is needed (step 202). The scrub controller issues a scrub write command for a cacheline to the write queue (step 210). If there are other writes in the write queue for the same cacheline (step 212=YES), method 200 waits until all other writes to the same cacheline have been executed (step 214). At this point, there are no other writes in the write queue for the same cacheline (step 212=NO). If the write queue is full (step 216=YES), method 200 waits until the write queue is not full (step 218). Once the write queue is not full (step 216=NO), a scrub write command is loaded into the write queue with a specified data dependency on a scrub read command that has not yet been issued (step 220). This data dependency is a feature that is already available in known memory controllers. A latch with an output NeedDDone (need data done) is provided in prior art memory controllers to indicate when data for a pending read is not yet in the memory controller's central data buffer. Once the data is read into the central data buffer, the NeedDDone latch is cleared to indicate that the data dependency has been satisfied. The preferred embodiments recognize that the presence of the NeedDDone signal allows implementing a scrub cycle in a way that does not use explicit atomic operations, such as the read-correct-write cycle shown in the prior art memory controller of FIG. 4.

Once the scrub write is written to the write queue in step 220, the memory controller 100 assures that subsequent writes to the same cacheline are not executed before the scrub write (step 230). The memory controller 100 also assures that subsequent writes to different cachelines may be processed before the scrub write is processed (step 240) because the scrub write does not affect the other pending writes to different cachelines. The scrub controller 110 then issues a scrub read command for the cacheline (step 250). The scrub read command is issued to the read queue 120 or to the read fast path (bypass) 180 (step 260). Once the data has been read by the scrub read command, the data is processed to correct all single-bit and single-symbol errors (step 270), and the processed data is written to the central data buffer. With the processed data now in the central data buffer, the data dependency for the scrub write in step 220 has now been met, so a signal is generated that the pending scrub write operation may proceed (step 280). In the preferred embodiments, this is accomplished by the NeedDDone latch being cleared once the data for the cacheline is written to the central data buffer. Because the data dependency has been met, the scrub write may now be performed (step 290).

Figure 3:
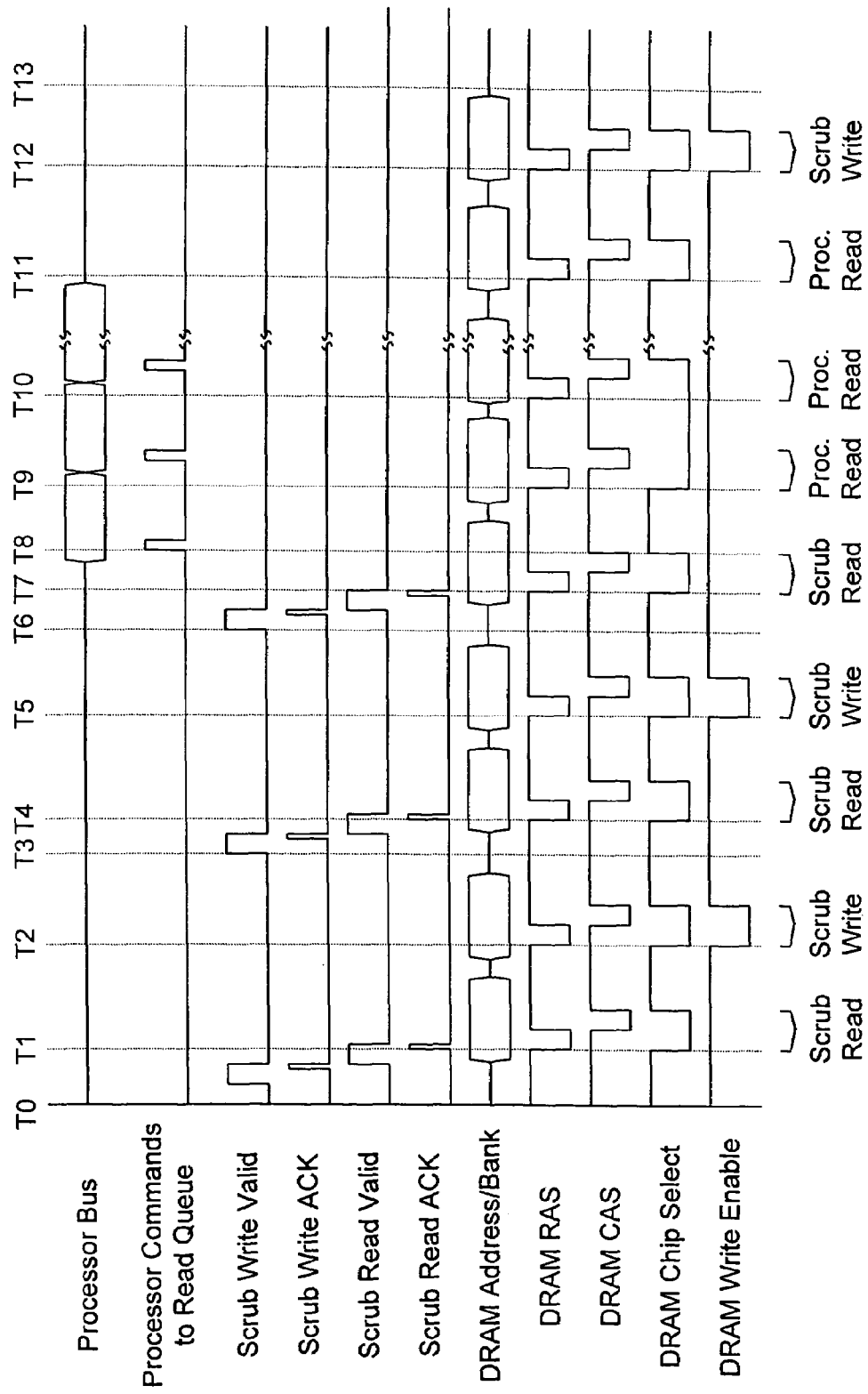
FIG. 3 is a sample timing diagram showing the function of the memory controller of FIG. 1.

The timing diagram of FIG. 3 shows the difference in timing when compared with the prior art timing in FIG. 6. The first scrub read is performed at T1, and the first scrub write is performed at T2, similar to the prior art timing in FIG. 6. Similarly, the second scrub read is performed at T4, the second scrub write is performed at T5, the third scrub read is performed at T7. Note that the burst of processor reads occurs just after T7, as it did in the prior art timing diagram of FIG. 6. These reads are given priority over any pending scrub write cycles. As a result, the burst of processor reads in period T7-T11 are processed without delay. Once the burst of processor reads is complete at T11, the scrub write can be performed at T12. The preferred embodiments thus allow processor reads to interrupt a pending scrub cycle to improve system performance, while still assuring data integrity during the scrub cycle. The result is that no explicit atomic operations are used by the scrub controller that could possibly delay pending processor reads. Because processor reads are allowed to interrupt a pending scrub cycle, and are not delayed by an explicit read-correct-write cycle, system performance is improved.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments are discussed herein with particular regard to DRAMs, the memory controller and methods of the preferred embodiments may be applied to any semiconductor memory that might be susceptible to soft errors.

What is claimed is:

1. A method for scrubbing a memory, the method comprising the steps of:
   (A) issuing a scrub write command to a cacheline that includes a specified address;
   (B) waiting for any writes to the same cacheline that are in a write queue to execute;
   (C) loading the scrub write command into the write queue specifying a data dependency on a subsequent scrub read command;
   (D) issuing a scrub read command to read data from the address;
   (E) processing the data to correct all single-bit and single-symbol errors;
   (F) indicating that the data dependency in step (C) is satisfied; and
   (G) the scrub write command writing the processed data to the address in memory.

2. The method of claim 1 further comprising the step of requiring any subsequent write to the same cacheline to be performed after the scrub write command is complete.

3. The method of claim 1 further comprising the step of allowing subsequent writes to a different cacheline to be processed before the scrub write command is complete.

4. The method of claim 1 further comprising the step of giving higher priority to processor reads than to the scrub read command.

5. A memory controller comprising:
   a write queue for write operations to a memory coupled to the memory controller;
   a scrub controller that issues a scrub write command to a cacheline that includes a specified address;
   in response to the scrub write command issued by the scrub controller, the memory controller performing the steps of:
   (A) waiting for any writes to the same cacheline that are in the write queue to execute;
   (B) loading the scrub write command into the write queue specifying a data dependency on a subsequent scrub read command;
   the scrub controller issuing a scrub read command to read data from the address;
   in response to the scrub controller issuing the scrub read command, the memory controller performing the steps of:
   (C) processing the data to correct all single-bit and single-symbol errors;
   (D) indicating that the data dependency in step (B) is satisfied once the data is processed in step (C); and
   (E) processing the scrub write command in the write queue to write the processed data to the specified address in the memory.

6. The memory controller of claim 5 wherein the memory controller further performs the step of requiring any subsequent write to the same cacheline to be performed after the scrub write command is complete.

7. The memory controller of claim 5 wherein the memory controller further performs the step of allowing subsequent writes to a different cacheline to be processed before the scrub write command is complete.

8. The memory controller of claim 5 wherein the memory controller gives higher priority to processor reads than to the scrub read command.

* * * * *